R. M. PIERSON.
HYDROMETER SYRINGE.
APPLICATION FILED DEC. 11, 1918.
1,296,694.
Patented Mar. 11, 1919.
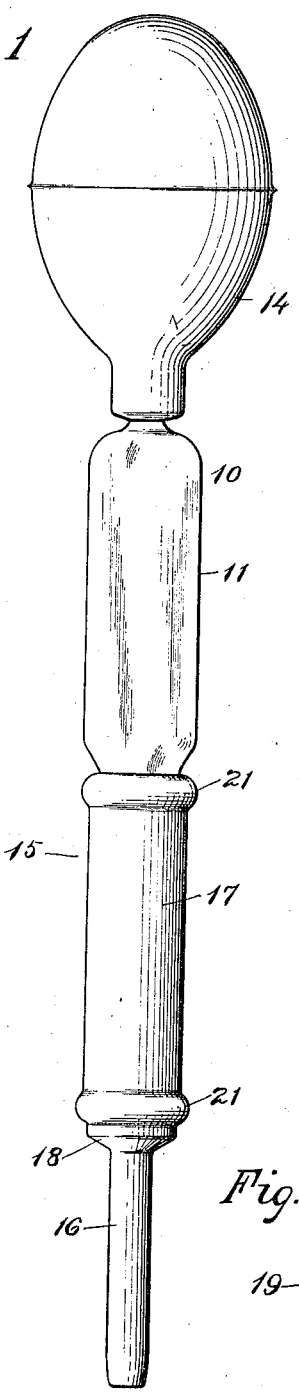
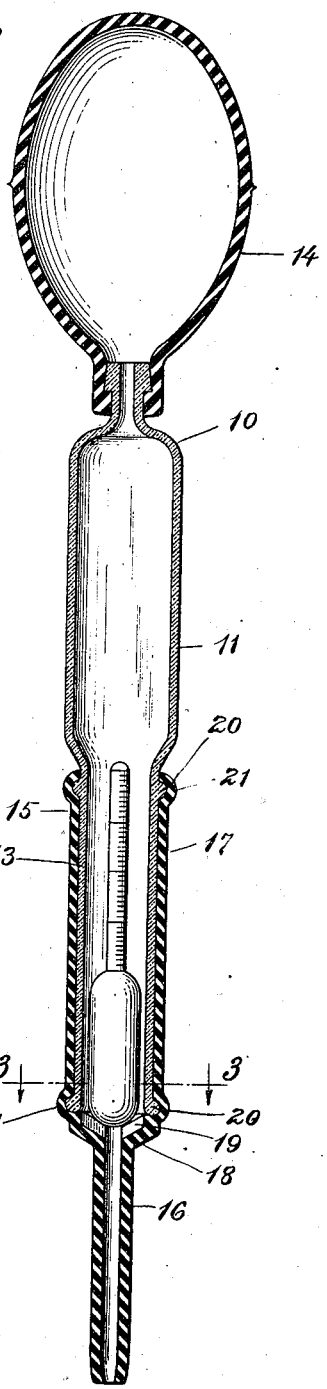
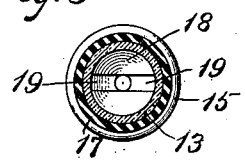
Inventor
Robert M Pierson

UNITED STATES PATENT OFFICE.

ROBERT M. PIERSON, OF AKRON, OHIO, ASSIGNOR TO THE B. F. GOODRICH COMPANY, OF NEW YORK, N. Y., A CORPORATION OF NEW YORK.

HYDROMETER-SYRINGE.

1,296,694.        Specification of Letters Patent.        Patented Mar. 11, 1919.

Application filed December 11, 1918. Serial No. 266,209.

*To all whom it may concern:*

Be it known that I, ROBERT M. PIERSON, a citizen of the United States, residing at Akron, in the county of Summit and State of Ohio, have invented a certain new and useful Hydrometer-Syringe, of which the following is a specification.

This invention relates to the construction of hydrometer syringes, and its principal objects are to provide increased protection to the glass portion of the instrument and a more effective fluid-tight seal or joint between the glass and the rubber nozzle portion.

Of the accompanying drawings,

Figure 1 is a side elevation of a hydrometer syringe constructed according to my invention.

Fig. 2 is a vertical section thereof.

Fig. 3 is a horizontal section on the line 3—3 of Fig. 2 without the float.

The glass member 10 of the syringe may be of any usual or suitable form, preferably including, however, an enlarged upper transparent sight portion 11 into which the float 12 rises when a reading is taken, and a relatively-narrow elongated lower portion 13 adapted to house the bulb of the float and preferably most or all of its stem when the syringe is empty, the reduced diameter of this portion 13 serving to restrict the float to lateral movements of small amplitude and thus protect it against breakage in a well-known manner.

At the upper end of the glass member is the usual compressible rubber bulb 14 for partially expelling the air from the syringe and then sucking up the liquid into the glass when the bulb expands.

15 is a soft-rubber nozzle member comprising a spout or nozzle 16 for insertion into the liquid, and a socket 17 molded integrally therewith. When the syringe is empty, the bulb of the float 12 rests on the floor or end wall 18 of the nozzle socket 17, said floor being formed with suitable raised portions separated by channels 19 which prevent the float from shutting off the passage through the nozzle. The socket 17 incloses the reduced portion 13 of the glass member for the whole length, as shown, or substantially the whole length of said reduced portion, and its aperture is initially somewhat smaller than the outer diameter of the glass portion 13, so that the elasticity of the rubber when stretched over the glass causes the socket closely to embrace the glass portion and seal the joint between the rubber and the glass, the sealing being rendered somewhat more effective by forming interfitting beads 20 and grooved portions 21 on the glass and rubber members respectively at the upper and lower ends of the socket, although this feature is not absolutely essential. The relatively-long rubber socket of the nozzle member dispenses with a threaded joint and provides a more effective fluid-tight seal by reason of the length thereof, while the combined thickness of glass and rubber over an increased length of the syringe provides better protection for the float than either the glass alone or the rubber alone would provide, while at the same time it affords increased protection against breakage of the glass member due to rough handling. The wall of the rubber socket can safely be made somewhat thinner or less stiff than is the case when a rubber-sided chamber is used as the sole protection for the float bulb when the syringe is empty.

I claim:

1. A hydrometer syringe comprising a tubular glass member adapted to act as a sight chamber and having a relatively-long portion for housing the float when the syringe is empty, a compressible bulb at the upper end of said member, and a soft-rubber nozzle member formed with a nozzle and a socket above said nozzle which incases and protects said float-housing portion of the glass member for substantially the entire length of the latter and forms an elongated sealed joint therewith.

2. A hydrometer syringe comprising a tubular glass member having an upper sight portion surmounted by a compressible bulb, and a lower elongated portion of reduced diameter adapted to house the float when the syringe is empty, and a soft-rubber nozzle member formed with a nozzle at its lower end and a socket at its upper end, said socket incasing substantially the entire length of the said float-housing portion of the glass member and forming an elongated fluid-tight joint therewith, the end wall of the socket member forming a supporting floor for the float when the syringe is empty.

In testimony whereof I have hereunto set my hand this 5th day of December, 1918.

ROBERT M. PIERSON.